(12) United States Patent
Ress, Jr. et al.

(10) Patent No.: US 9,032,737 B2
(45) Date of Patent: May 19, 2015

(54) COMBUSTOR ADDED TO A GAS TURBINE ENGINE TO INCREASE THRUST

(75) Inventors: Robert A. Ress, Jr., Carmel, IN (US);
Victor L. Oechsle, Avon, IN (US);
Randall E. Yount, Indianapolis, IN (US); Stephen A. Bergeron, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 1178 days.

(21) Appl. No.: 12/976,517

(22) Filed: Dec. 22, 2010

(65) Prior Publication Data

US 2012/0067053 A1 Mar. 22, 2012

Related U.S. Application Data

(60) Provisional application No. 61/291,220, filed on Dec. 30, 2009.

(51) Int. Cl.
| | |
|---|---|
| *F02K 3/10* | (2006.01) |
| *F23R 3/42* | (2006.01) |
| *F23R 3/06* | (2006.01) |
| *F23R 3/26* | (2006.01) |

(52) U.S. Cl.
CPC ... *F23R 3/42* (2013.01); *F02K 3/10* (2013.01); *F23R 3/06* (2013.01); *F23R 3/26* (2013.01); *F23R 2900/00014* (2013.01); *F05D 2220/80* (2013.01); *Y02T 50/675* (2013.01)

(58) Field of Classification Search
CPC .............. F02K 3/04; F02K 3/02; F02K 3/10; F02K 3/06; F02K 1/02

USPC ............ 60/39.23, 39.17, 262, 264, 733, 774, 60/791, 740, 741, 761, 762
See application file for complete search history.

(56) References Cited

U.S. PATENT DOCUMENTS

| | | | |
|---|---|---|---|
| 3,768,255 A | 10/1973 | Barnes, Jr. et al. | |
| 3,807,169 A | 4/1974 | Bradford | |
| 3,844,118 A | 10/1974 | Wilkinson | |
| 3,879,942 A | 4/1975 | Dorn et al. | |
| 3,930,370 A * | 1/1976 | Markowski et al. | ............ 60/762 |
| 4,050,243 A | 9/1977 | Holzman et al. | |
| 4,063,415 A | 12/1977 | Rhoades | |
| 4,072,008 A | 2/1978 | Kenworthy et al. | |

(Continued)

OTHER PUBLICATIONS

International Search Report and Written Opinion, Nov. 4, 2011, PCT/US2010/062503.

*Primary Examiner* — Thomas Denion
*Assistant Examiner* — Vikansha Dwivedi
(74) *Attorney, Agent, or Firm* — Krieg DeVault LLP

(57) ABSTRACT

A gas turbine engine having a ramburner is disclosed. The ramburner is disposed downstream of a gas turbine engine combustor and receives an engine exhaust flow from the gas turbine engine combustor. The ramburner also accepts a bypass air. Fuel is injected into the ramburner and a combustion reaction is auto-initiated based upon local gas temperatures. No mechanical flame holders need be used. A slidable valve may be used to vary the amount of bypass air into the ramburner. A movable cowl and a plug nozzle form an exit flow path of the gas turbine engine. The movable cowl can be positioned to vary a throat area and exit area of the gas turbine engine based upon the operation of the ramburner, which may be influenced by the amount of bypass air entering the ramburner.

18 Claims, 7 Drawing Sheets

(56) References Cited

U.S. PATENT DOCUMENTS

| | | | |
|---|---|---|---|
| 4,170,109 A * | 10/1979 | Egan et al. ............... 60/204 |
| 4,391,094 A | 7/1983 | Engel et al. |
| 4,445,338 A | 5/1984 | Markowski et al. |
| 4,651,523 A | 3/1987 | Adams |
| 4,745,740 A | 5/1988 | Dunn et al. |
| 4,807,435 A | 2/1989 | Moll |
| 5,054,288 A | 10/1991 | Salemann |
| 5,284,014 A | 2/1994 | Brossier et al. |
| 5,287,697 A * | 2/1994 | Johnson et al. ............ 60/226.3 |
| 5,307,624 A * | 5/1994 | Even-Nur et al. ............ 60/226.3 |
| 5,347,807 A | 9/1994 | Brossier et al. |
| 5,694,767 A * | 12/1997 | Vdoviak et al. ............... 60/226.3 |
| 5,749,219 A * | 5/1998 | DuBell ........................... 60/804 |
| 5,784,877 A | 7/1998 | Hewitt |
| 5,899,058 A * | 5/1999 | Narcus et al. ................ 60/226.3 |
| 6,058,846 A | 5/2000 | Boyd |
| 6,557,339 B2 | 5/2003 | Demay et al. |
| 6,725,664 B2 | 4/2004 | Carton |
| 6,915,626 B2 | 7/2005 | Carton |
| 7,059,136 B2 * | 6/2006 | Coffinberry ................... 60/785 |
| 2006/0042227 A1 | 3/2006 | Coffinberry |

* cited by examiner

COMBUSTOR ADDED TO A GAS TURBINE ENGINE TO INCREASE THRUST

CROSS REFERENCE TO RELATED APPLICATIONS

The present application claims the benefit of U.S. Provisional Patent Application 61/291,220, filed Dec. 30, 2009, and is incorporated herein by reference.

GOVERNMENT RIGHTS

The present inventions were made with U.S. Government support under contract number F33615-03-D-2357. The U.S. Government has certain rights in the present inventions.

TECHNICAL FIELD

The present invention generally relates to gas turbine engines, and more particularly, but not exclusively, to ramburners for gas turbine engines.

BACKGROUND

Combustors, such as ramburners, can be added to a gas turbine engine to increase thrust at supersonic speeds and may be particularly suited for turbojet or low bypass ratio turbofan engines. The speed range over which a ramburner may operate include, but is not limited to, Mach 3.0 to Mach 4.0+. Some existing systems have various shortcomings relative to certain applications. Accordingly, there remains a need for further contributions in this area of technology.

SUMMARY

One embodiment of the present invention is a unique gas turbine engine combustor. Other embodiments include apparatuses, systems, devices, hardware, methods, and combinations for a gas turbine engine having a ramburner. Further embodiments, forms, features, aspects, benefits, and advantages of the present application shall become apparent from the description and figures provided herewith.

DETAILED DESCRIPTION OF REPRESENTATIVE EMBODIMENTS

Figure 1:
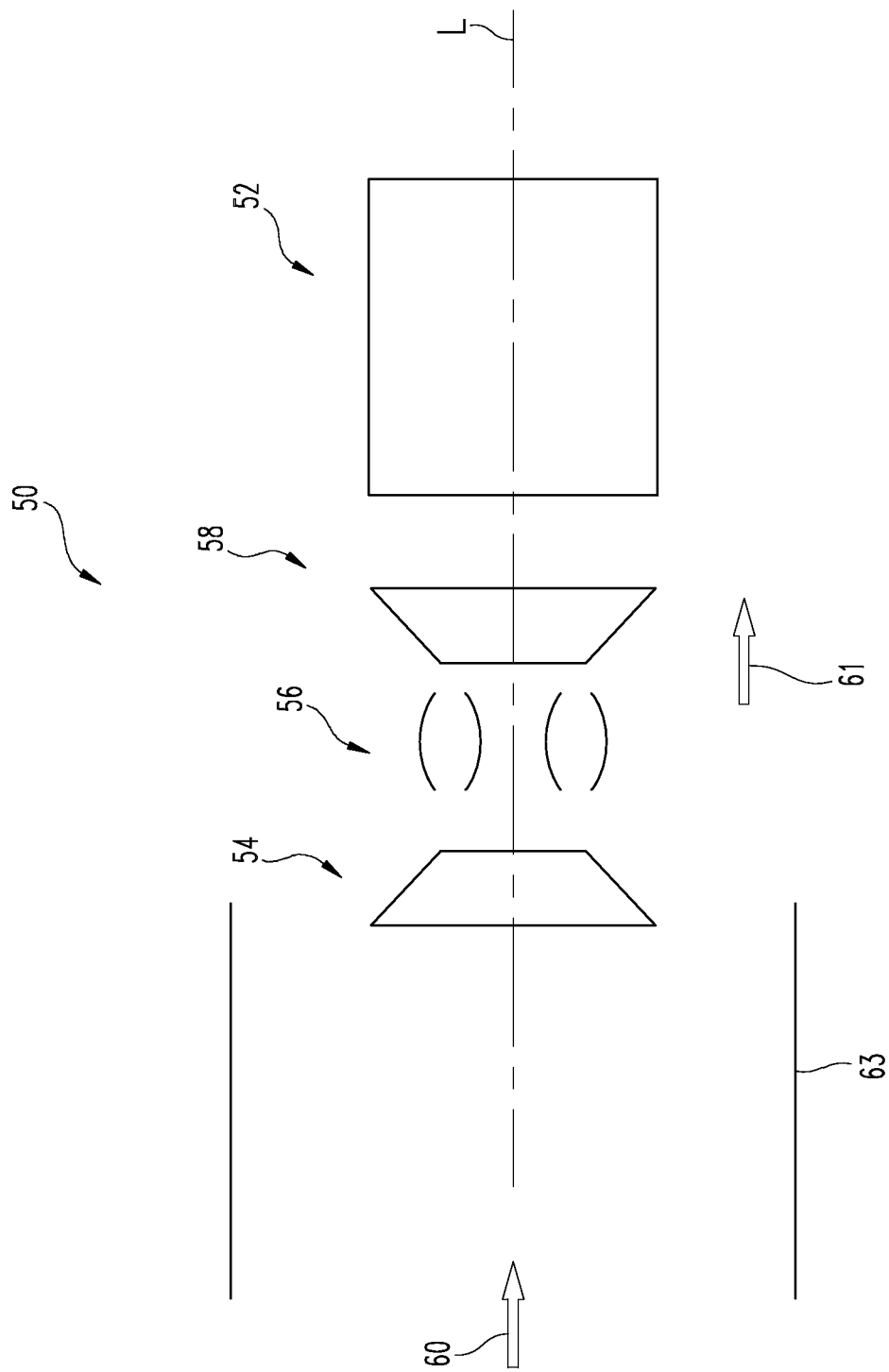
FIG. 1 depicts a view of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a gas turbine engine 50 is depicted having a ramburner 52 located downstream of a compressor 54, a combustor 56, and a turbine 58. The gas turbine engine 50 can be used to provide propulsive power to an aircraft. As used herein, the term "aircraft" includes, but is not limited to, airplanes, unmanned space vehicles, fixed wing vehicles, variable wing vehicles, uninhabited combat air vehicles, and others. Though the gas turbine engine 50 is depicted having a single compressor and turbine spool, other embodiments can include additional spools as will be appreciated by those of skill in the art. In addition, the compressor 54 and the turbine 58 can have any number of stages and can have inlet guide vanes or exit guide vanes. Furthermore, the gas turbine engine 50 can be a turbojet, turbofan, or any other type of gas turbine engine 50, and can also be a variable or adaptive cycle engine. In some embodiments, the gas turbine engine 50 can be coupled with other power plants.

A flow stream entering the gas turbine engine 50 is split into a core flow stream 60 and a bypass flow stream 61. The core flow stream 60 is compressed by the compressor 54 before being mixed with fuel and burned in the combustor 56. The products of combustion from the combustor 56 form a combustion flow stream which enters the turbine 58. The turbine 58 extracts useful work from the combustion flow stream to drive various components of the gas turbine engine 50. The ramburner 52 accepts a flow stream heated by the combustor 56. In the illustrative embodiment, the ramburner 52 accepts the combustion flow stream exiting the turbine 58.

Fuel is injected into the ramburner 52 and is mixed with the flow stream heated by the combustor 56 (in the illustrative embodiment, the combustion flow stream) as well as at least a portion of the bypass air stream 61 and burned in a ramburner combustion process. In the illustrative embodiment, the bypass flow stream 61 provides additional oxygen to the ramburner combustion process while also cooling down the vitiated combusted gases so that ramburner outlet temperatures are maintained within material capability limits. Some embodiments of the ramburner 52, however, may not maintain temperatures within material capability limits during some operations. One embodiment of the ramburner 52 includes uncooled, non-metallic structural features that form a main flow path, and in some embodiments a secondary flow path, of the ramburner. In some embodiments, an active cooling scheme may be employed either alternatively and/or additionally.

The bypass flow stream 61 can, but need not, result from a vehicle inlet 63 that is sized for low speed and lower altitude conditions. For example, the vehicle inlet 63 can be over designed for operation in an upper right hand corner of the gas turbine engine operating envelope if it is originally designed for low speed, low altitude conditions. The over-designed inlet can produce additional, unneeded mass flow in the upper right hand corner. The extra mass flow captured by the vehicle inlet can be used in the ramburner to provide additional thrust while helping to cool down the products of combustion before exiting the ramburner. Some of the bypass flow stream 61, or other flow stream, can also be used for secondary flow to provide backside convective cooling of at least some of the ramburner structural components. Though the bypass flow stream 61 is depicted as originating from the vehicle inlet 63, some embodiments of the gas turbine engine 50 can include bypass flow streams that originate from locations or sources other than the vehicle inlet 63. For example, in some embodiments the bypass flow stream 61 can originate from a separate inlet dedicated to providing air flow to the ramburner 52. Other non-limiting examples include providing the bypass flow stream 61 that is split from the core flow stream 60 after being at least partially compressed by the compressor 54. Still other examples include providing the bypass flow stream 61 from a separate source, such as external pressure tanks.

Figure 2A:
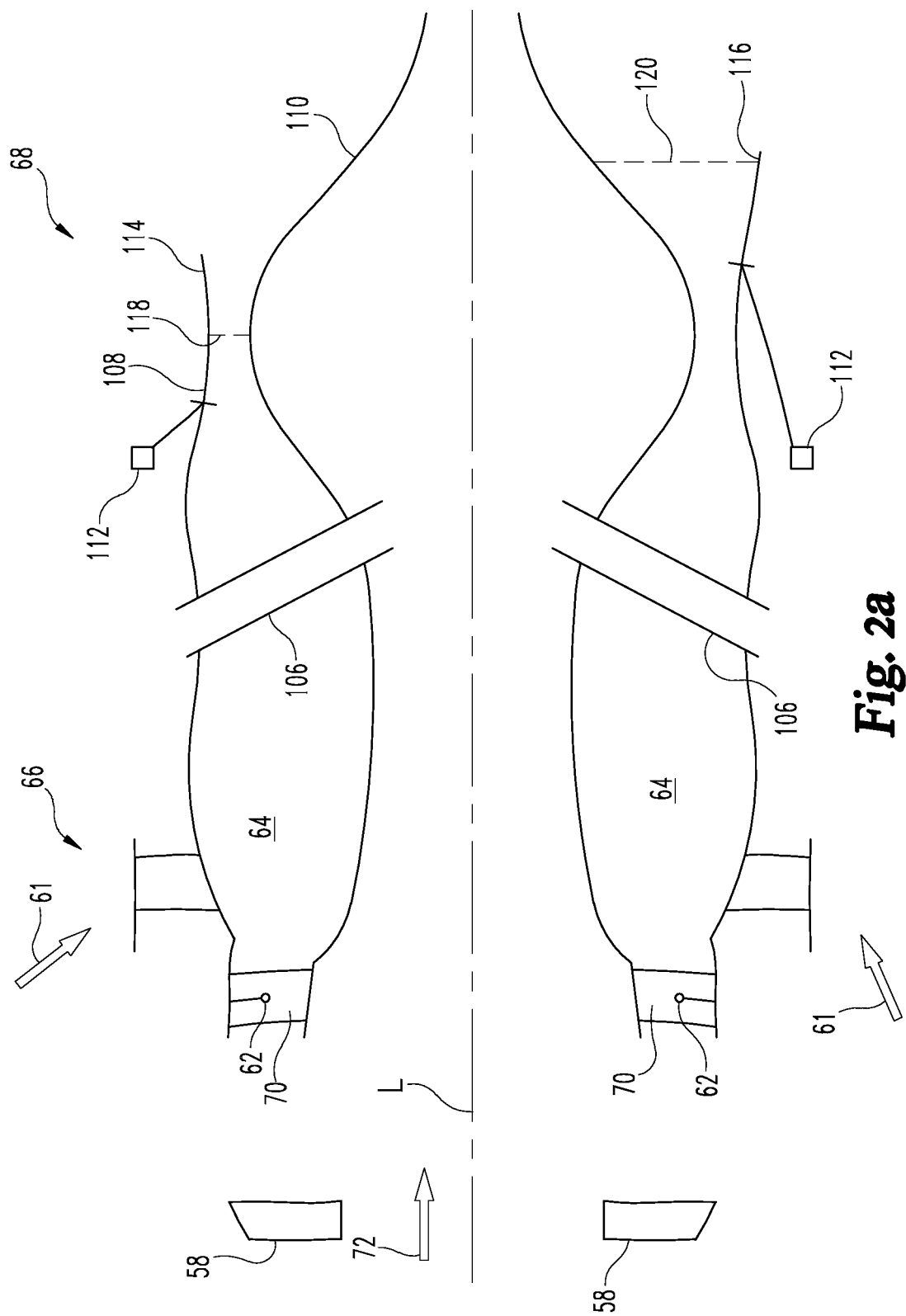
FIG. 2a depicts a view of one embodiment of a ramburner.
Figure 2B:
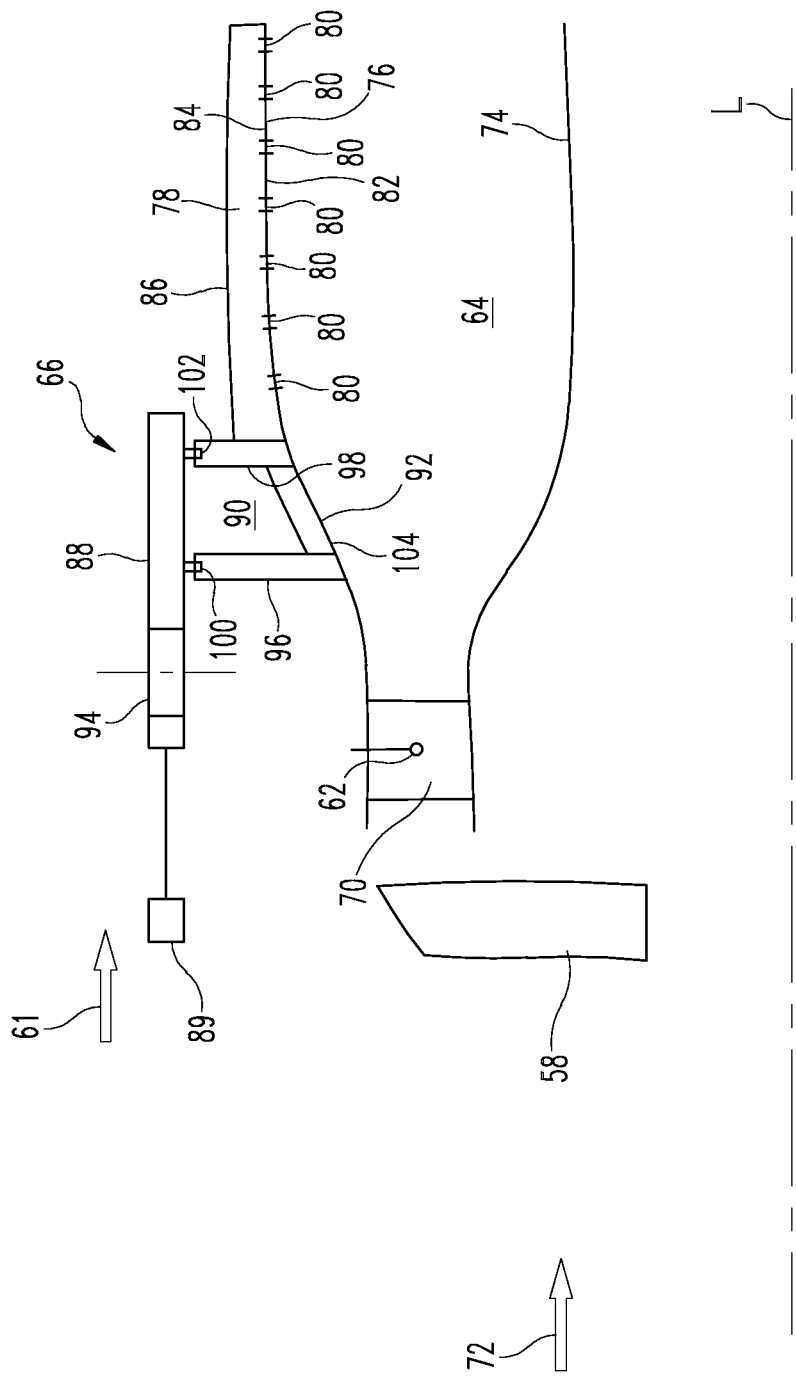
FIG. 2b depicts a view of one embodiment of a ramburner.

Turning now to FIGS. 2a and 2b, the ramburner 52 includes a fuel injector 62, a ramburner combustion chamber 64, an air injection system 66, and an exit 68. As will be described below, in one form of operation the ramburner 52 includes no mechanical form of flame stabilizers; instead, a combustion flame is stabilized by an auto ignition reaction created inside the ramburner. Although the gas turbine engine 50 need not include mechanical flame stabilizers in one form of operation of the ramburner 52, in other modes of operation the gas turbine engine 50 can include flame stabilizers. The through-flow velocity of the ramburner exceeds a turbulent flame speed of conventional augmenters and combustors. Therefore, to operate without mechanical flame holders and achieve auto ignition, the ramburner operates at high turbine exit temperatures to ensure that an ignition delay times are within acceptable limits. In one form of operation the ignition delay time is within 1 millisecond from a fuel injection point. By operating without mechanical flame holders, the ramburner 52 offers additional thrust capability to an air breathing gas turbine engine, without a cycle penalty due to pressure loss such as might be present in conventional augmenter designs having mechanical flame holder features.

The fuel injectors 62 provide fuel to the ramburner combustion chamber 64 downstream from the combustor 56. The fuel injectors 62 can provide any variety of fuel to the ramburner combustion chamber 64. Additionally, the fuel injectors 62 can provide a variety of fuel flow rates to the ramburner 52. The fuel injectors 62 are arranged within a turbine exit vane 70 in the illustrative embodiment, but can also be provided elsewhere within gas turbine engine 50. Though only two fuel injectors 62 are depicted in the illustrative embodiment, other embodiments can include fewer or more than two injectors. The fuel injectors in the illustrative embodiment are depicted at similar axial and radial locations, but in other embodiments the fuel injectors 62 can be at different locations. Furthermore, not all fuel injectors 62 need be located in the same structure. For example, one embodiment of the ramburner 52 can include fuel injectors located in the turbine exit vane 70 as well as in other structure.

The turbine exit vane 70 interacts with the combustion flow stream 72 and can serve to deswirl the fluid. Deswirling the fluid assists in improving axial thrust output. Any number of turbine exit vanes 70 can be used in various embodiments. Individual turbine exit vanes 70 have cambered, aerodynamic shapes, but the vanes can take on different forms in other embodiments. In addition, the turbine exit vanes 70 can be configured to have a variable pitch.

The ramburner combustion chamber 64 in the illustrative embodiment is disposed downstream of and in fluid communication with the combustor 56. In the illustrative form the ramburner combustion chamber 64 includes an inner liner 74, an outer liner 76, and a screech chamber 78. The ramburner combustion chamber 64 receives the combustion flow stream 72 from the combustor 56, the bypass flow stream 61 from the vehicle inlet 63, as well as fuel from the fuel injector 62. The ramburner combustion chamber 64 in the illustrative embodiment extends from the fuel injector 62 to the exit 68 but in some embodiments the ramburner combustion chamber 64 can extend further upstream or further downstream.

The inner liner 74 of the illustrative embodiment extends from the fuel injector 62 to the exit 68 and forms the radially inner surface of the ramburner combustion chamber 64. In one form, the inner liner 74 is configured to withstand high operating temperatures and can be passively or actively cooled. In some embodiments the inner liner 74 can partially extend upstream from the fuel injector 62. The inner liner 74 can be annular in shape, but can also take on other forms in different embodiments. In the illustrative embodiment the inner liner 74 radially expands from an outermost area near the fuel injector 62 to an innermost area as the inner liner 74 extends from the fuel injector 62 to the exit 68. Some alternative embodiments, however, may include an inner liner 74 that extends from the fuel injector 62 at a constant radial distance along an axial length of the ramburner.

The outer liner 76 of the illustrative embodiment extends from the air injector system 66 toward the exit 68. Like the inner liner 74, the outer liner 76 can be configured to withstand high operating temperatures and can be passively or actively cooled. Some embodiments of the ramburner 52 can include a portion of the outer liner 76 extending axially upstream of the air injector system 66, while the remaining portion of the outer liner extends downstream to the exit 68. The outer liner 76 can be annular in shape, but can take on other forms as well. In the illustrative embodiment the outer liner 76 is depicted as axially extending at a constant radial distance, but in some embodiments the outer liner 76 can axially extend at a varying radial distance. To set forth just one non-limiting example, the outer liner 76 may have a shape that is at least partially the mirror opposite of the inner liner 74 of the illustrative embodiment.

The outer liner 76 of the illustrative embodiment includes a series of evenly spaced apertures 80, but in some embodiments the apertures 80 may not be evenly spaced. The apertures permit interaction of fluid on either side of the outer liner 76. Each of the apertures 80 in the illustrative embodiment has a constant cross sectional area from a combustion side 82 to a screech chamber side 84. Other embodiments, however, can include the apertures 80 having a variety of cross sectional areas, or apertures that have a varying cross sectional area from the combustion side 82 to the screech chamber side 84. Some embodiments can have the apertures 80 distributed over only a portion of the outer liner 76, or distributed in select areas of the outer liner 76. Furthermore, some embodiments can include apertures 80 distributed randomly in the outer liner 76.

The screech chamber 78 is formed between the outer liner 76 and a screech surface 86 and extends from the air injector system 66 to the exit 68. In some alternative embodiments the screech chamber 78 can extend only partially between the air injector system 66 and the exit 68. The screech chamber 78 serves to mitigate acoustic instabilities and/or maintain combustion stability in the ramburner combustion chamber 64 by absorbing and/or attenuating unsteady pressure oscillations.

The air injection system 66 provides air to the ramburner combustor chamber 64 and in the illustrative form includes a sleeve 88, a plenum 90, and an air injector 92. The sleeve 88 includes an aperture 94 which permits passage of the bypass flow stream 61 and has an annular shape in the illustrative embodiment. In other embodiments, the sleeve 88 can take on forms other than annular. To set forth just one non-limiting example, in some configurations the sleeve can be a flat plate and/or can be composed of a number of individual segments that in total compose the sleeve 88. The sleeve 88 can be made from a variety of materials. The sleeve 88 is operable to move axially from a fore position to an aft position such that the aperture 94 permits passage of at least a portion of the bypass flow stream 61 to the plenum 90. In the axially fore position in the illustrative embodiment, the sleeve 88 permits minimum passage of any of the bypass flow stream 61, while in an axially aft position the sleeve 88 permits a maximum passage of the bypass flow stream 61. The sleeve can be movable to any intermediate position to permit passage of a portion of the bypass flow stream 61. Alternative embodiments can permit passage of the bypass flow stream 61 in the axially fore position while the axially aft position prohibits passage of the bypass flow stream 61. In still further embodiments, the sleeve may not permit passage at either the axially fore or aft positions, but rather permits passage at some intermediate position. Other variations of mass flow as a function of sleeve position are also contemplated herein. An actuator 89 can be used to move the sleeve 88. The actuator 89 may be any variety of actuator such as electric, pneumatic, hydraulic, or ball screw, to set forth just a few non-limiting examples.

The aperture 94 can be formed in any shape, such as rectangular or circular to set forth just a few non-limiting examples. Furthermore, the apertures 94 can have a variety of cross sectional areas. The sleeve 88 may include only one aperture 94 in some embodiments, but other embodiments can include any number of apertures 94. In those embodiments having multiple apertures, the apertures can have identical shapes and can be evenly spaced about the circumference or outer periphery of the sleeve 88. In other embodiments, however, one or more apertures, or sets of apertures, can have unique shapes, unique cross sectional areas, and can be at a variety of relative spatial locations. Furthermore, the apertures need not be evenly spaced about the periphery of the sleeve 88.

The plenum 90 in the illustrative embodiment is located between the sleeve 88, the air injector 92, an upstream radial flange 96, and a downstream radial flange 98. The plenum 90 receives at least a portion of the bypass flow stream 61 from the aperture 94 of the sleeve 88. The plenum 90 can be an annular plenum. In other embodiments, however, multiple plenums can be used and arrayed circumferentially around the gas turbine engine 50, some of which can be partially annular in shape. The plenum 90 can have any variety of internal volumes. In those embodiments having multiple plenums, the various plenums can have unique internal volumes. In the illustrative embodiment, a single aperture 94 feeds a single plenum 90. In other embodiments, however, the single aperture 94 can feed multiple plenums. In further embodiments, a single plenum can be fed by multiple apertures.

The upstream radial flange 96 and the downstream radial flange 98 in the illustrative embodiment extend radially away from a centerline L of the gas turbine engine 50. The radial flanges 96 and 98 serve to locate the sleeve 88 in the illustrative embodiment. In some embodiments, however, the radial flanges 96 and 98 can have an axial extension such that one or both of the radial flanges 96 and 98 form an angle relative to the centerline L of the gas turbine engine 50. The radial flanges 96 and 98 are formed as integral pieces in the illustrative embodiment and extend circumferentially around the gas turbine engine 50. In other embodiments, however, either or both of the radial flanges 96 and 98 can be formed as a separate number of structures that together assist in defining multiple plenums.

In the illustrative embodiment, piston rings 100 and 102 are located at the extreme outer end of the radial flanges 96 and 98 to provide a sealing mechanism for the bypass flow stream 61. The piston rings 100 and 102 can also serve to provide a sealing mechanism to prevent intrusion of exhaust gases and possible secondary cooling flows into the plenum 90, depending on the mode of operation. In some embodiments, only one piston ring may be used. For example, the piston ring 102 can be missing. Other types of sealing arrangements are contemplated herein.

The air injector 92 can be formed within a bottom 104 of the plenum 90 and can take the form of a slit in the illustrative embodiment. In other embodiments the bottom 104 of the plenum 90 can be removed such that the plenum 90 is exposed to the ramburner combustion chamber 64. The air injector 92 can take on a variety of forms such as rectangular and circular, among possible others. Although only one air injector is shown in the illustrative embodiment, other embodiments can include any number of injectors, all of which can be identical in shape and evenly spaced around the circumference or outer periphery of the bottom 104. Some embodiments can include air injectors having a variety of shapes and spacing. Furthermore, some embodiments include air injectors 92 that produce a variety of penetration depths when in use. The bottom 104 of the air injector 92 can be formed at an angle relative to the centerline L of the gas turbine engine 50 including, but not limited to, parallel and orthogonal.

In one form the exit 68 includes struts 106, a cowl 108, and a plug nozzle 110 and forms a flow path downstream of the ramburner combustion chamber 64. The struts 106 provide support to the ramburner 52 and can be evenly spaced around the circumference of the exit 68. In some embodiments, the struts need not be evenly spaced. Though only two struts 106 are depicted in the illustrative embodiment, fewer or more than two struts can be included in other embodiments.

The cowl 108 is axially moveable from a fore position 114 to an aft position 116 in the illustrative embodiment. The cowl 108 can be moved by an actuator 112 which can be electric, pneumatic, or hydraulic, to set forth just three non-limiting examples.

The plug nozzle 110 is disposed in the exit 68 of the gas turbine engine 50 and, in conjunction with the cowl 108, provides a throat area 118 and an exit area 120. In some embodiments the throat area 118 and the exit area 120 may be defined by other structure, whether or not the structure includes the plug nozzle 110 and the cowl 108. The exit area 120 and the throat area 118 can be variable. The plug nozzle 110 is not movable in the illustrative embodiment, but other embodiments can include a movable plug nozzle 110.

Figure 3A:
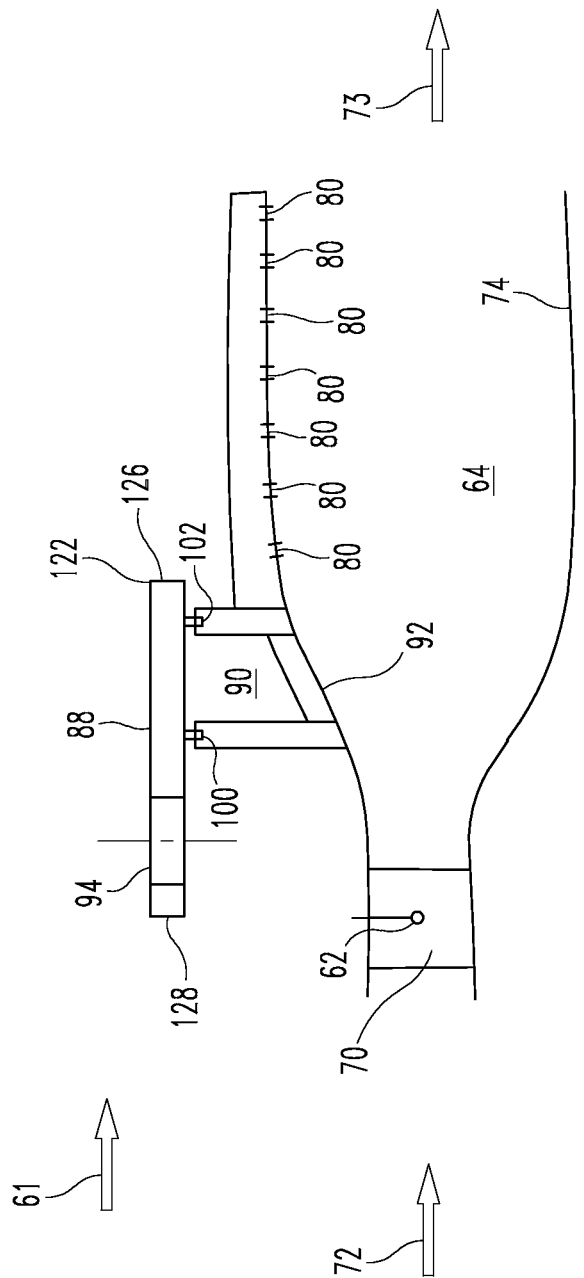
FIG. 3a depicts one embodiment of a sleeve in an axial position.
Figure 3B:
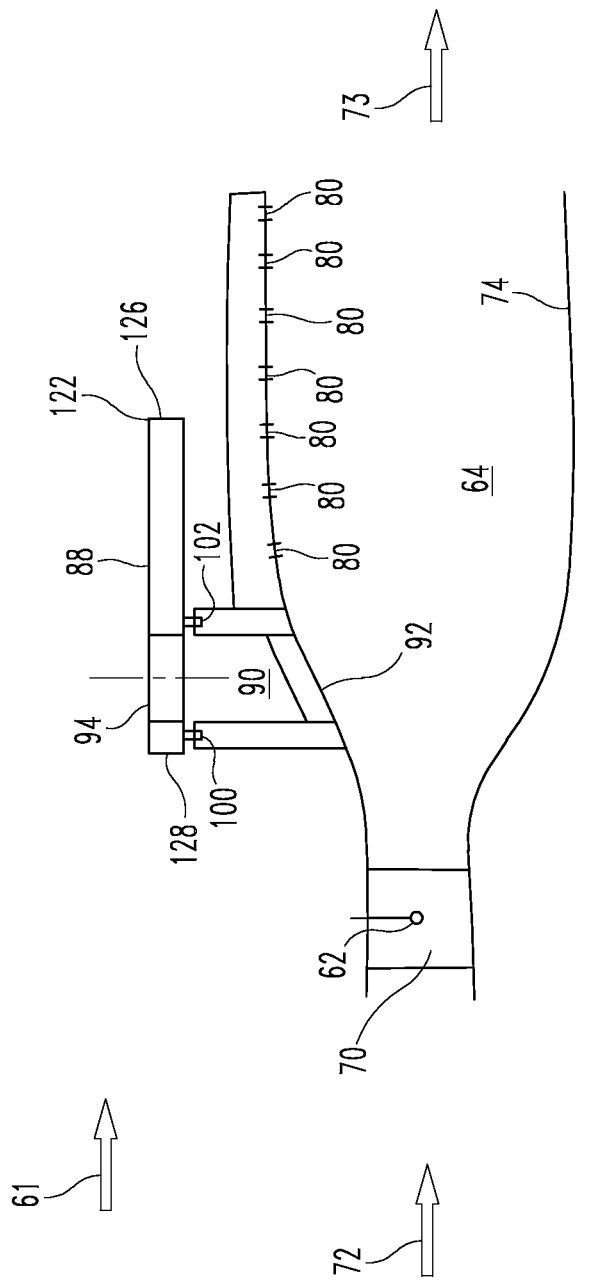
FIG. 3b depicts one embodiment of a sleeve in another axial position.

Turning now to FIGS. 3a and 3b, movement of the sleeve 88 is depicted. The sleeve is axially translated from a first position 122 to a second position 124. The first position 122 is an axially fore position and the second position 124 is an axially aft position. As discussed above, the sleeve 88 can be positioned to any intermediate position as well. While the illustrative embodiment depicts the sleeve as permitting little if any passage of the bypass flow stream 61 in the axially fore position, the sleeve 88 can be rearranged in other embodiments to provide for maximum passage of the bypass flow stream 61 in the axially fore position. For example, the aperture 94 can be configured near an aft end 126 in an alternative embodiment, as opposed to a fore end 128 as depicted in FIGS. 3a and 3b. The aperture 94 can be located elsewhere within the sleeve 88 in other embodiments.

In one form of operation, the gas turbine engine 50 includes a series of apertures 94 in the sleeve 88 to allow entry of the bypass flow stream 61 into the plenum 90 and on to the ramburner 52 in a variable manner. With the sleeve 88 in the forward position, the apertures 94 are located ahead of a forward piston ring 100 and no bypass flow stream 61 enters the ramburner combustion chamber 64. With the sleeve 88 in an aft position, the apertures 94 are located between piston rings 100 and 102 and full bypass flow occurs. Positioning the sleeve anywhere between these two extremes may provide a fractional flow of the bypass flow stream 61 to the plenum 90 and on to the ramburner combustion chamber 64. The amount of bypass flow stream 61 may be determined by the geometry of the apertures in the sleeve and the amount of aperture area positioned aft of the forward piston ring 100. When transitioning from dry operation to ramburning operation, the aperture area can be gradually increased to minimize load spikes on the structure. The sleeve 88 may thus becomes a metering valve or a bypass air injection valve.

In one form, the sleeve 88 allows a proper amount of engine bypass flow stream 61 to be admitted into the ramburner combustion chamber 64 at the right time. The sleeve 88 can be correctly timed and actuated in tandem with the cowl 108 to provide control of the ramburner by allowing the main engine, which includes the compressor 54, the combustor 56, and the turbine 58, of the gas turbine engine 50 to operate independently of the ramburner 52 at a constant corrected speed no matter where the ramburner is operating. This allows for simplified control operation based on engine corrected speed. The sleeve 88 can control the amount of the bypass flow stream 61 entering the ramburner 52 and can totally shut and isolate the bypass flow from the ramburner flow path in adverse pressure conditions, such as when the turbo-machinery of the gas turbine engine 50 sustains the vehicle at lower speeds, and perhaps even through the transonic range. The air injectors 92 can be configured in a precise manner to control the air entering the ramburner combustion chamber 64 so as to create the right mixing of the cooler bypass flow stream 61 with the preburned combustion flow stream 72 of the illustrated embodiment inside the ramburner combustion chamber 64 to cool the exhaust 73. The gas turbine engine 50 provides a balance of the bypass flow stream 61 used for mixing without destroying the key auto-ignition reaction that forms that basis of the flame stabilization inside the ramburner 52. The apertures 94 and the air injectors 92 allow for controlled introduction of engine bypass flow stream 61 through discrete air injection sources. A combination of both high penetration and shallow penetration air jets achieve optimum combustion reaction and mixing without disturbing the auto ignition flame stabilization. These air jets are also used to provide effective mixing of the combustion products to control an exit flow temperature profile of the ramburner 52.

Figure 4A:
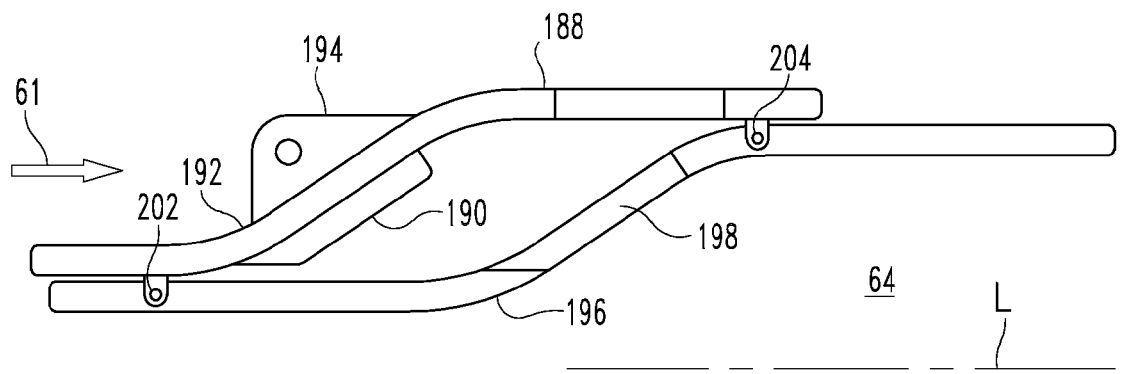
FIG. 4a depicts one embodiment of a sleeve.
Figure 4B:
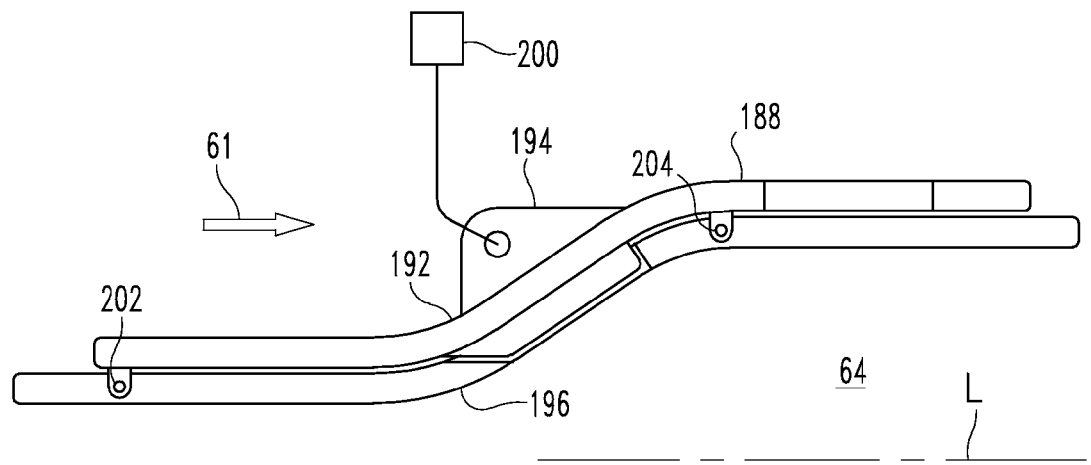
FIG. 4b depicts one embodiment of a sleeve.
Figure 5A:
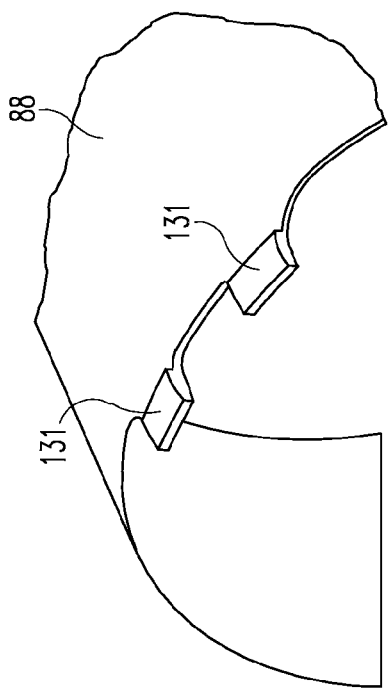
FIG. 5a depicts one embodiment of a sleeve.
Figure 5B:
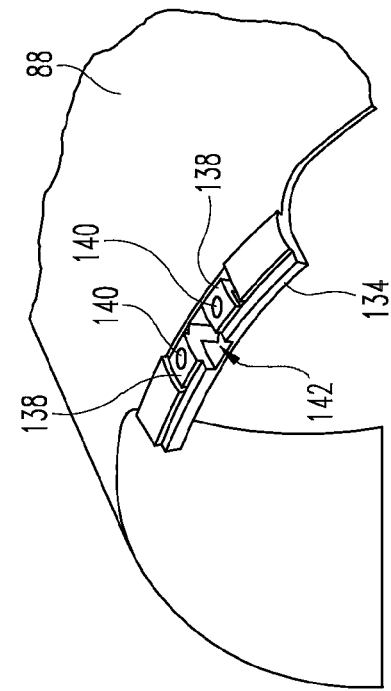
FIG. 5b depicts one embodiment of a sleeve having a connection.
Figure 5C:
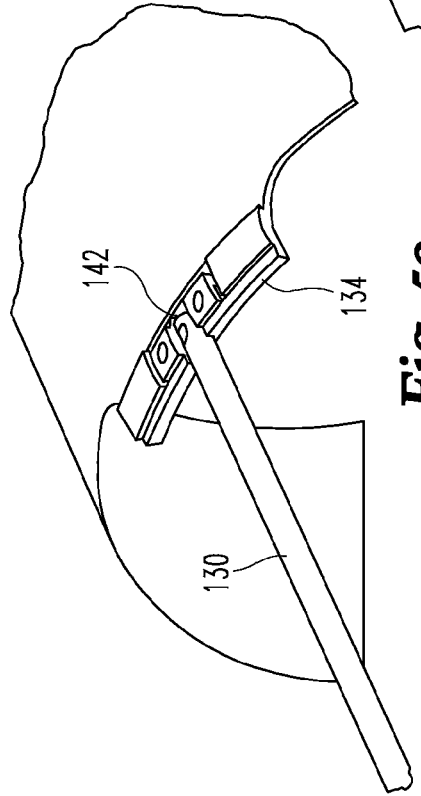
FIG. 5c depicts one embodiment of a sleeve having a connection.
Figure 5D:
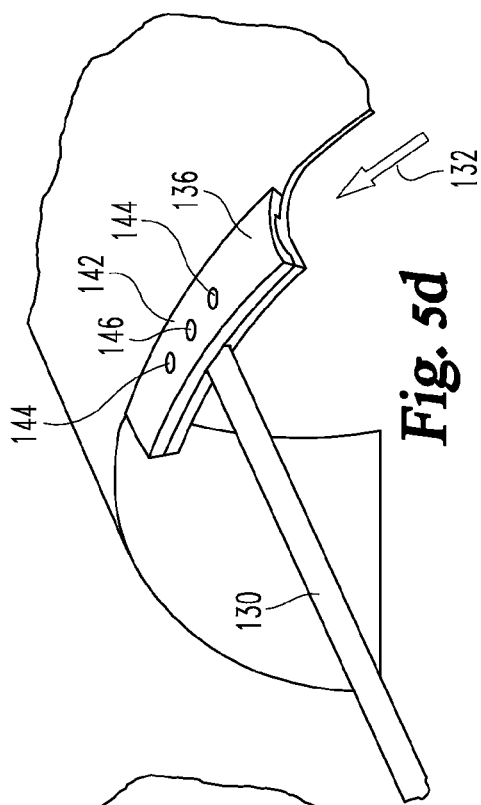
FIG. 5d depicts one embodiment of a sleeve having a connection.

FIGS. 4a and 4b depict an embodiment of a sleeve 188 having a protrusion 190, a backplate 192, and a flange 194. The sleeve 188 of this embodiment interacts with a wall member 196 to provide at least a portion of the bypass flow stream 61 to the ramburner combustion chamber 64. FIG. 4a depicts the sleeve 188 in a non-engaged position, while FIG. 4b depicts the sleeve 188 in an engaged position with the wall member 196. In the illustrated embodiment, the wall member 196 depicted in FIGS. 4a and 4b can be similar to the outer liner 76 described in another embodiment described hereinabove. The protrusion 190 is defined in the backplate 192 of the sleeve 188 and is complementary in shape to an opening 198 defined in the wall member 196 such that when the sleeve 188 is axially moved and engaged with the wall member 196, very little of the bypass flow stream 61 may be permitted to enter the ramburner combustion chamber 64. In some embodiments, the protrusion 190 need not be complementary to the opening 198. The sleeve 188 is annular in the illustrative embodiment and can have any number of protrusions 190. Other embodiments, however, need not be annular. For example, the sleeve 188 may be formed as a flat plate, to set forth just one non-limiting example. The opening 198 can be similar to the air injector 92 described in an embodiment hereinabove. An actuator 200 can be attached to the flange 194 of the sleeve 188 to provide movement thereof. Piston rings 202 and 204 can be provided to assist in sealing the sleeve 188.

Turning now to FIGS. 5a, 5b, 5c, and 5d, perspective views of the sleeve 88 is shown in one embodiment of various stages of mating to an actuator rod 130 via a connection 132. The actuator rod 130 can be connected to any variety of actuators, such as, but not limited to, linear actuators and rotary actuators. The sleeve 88 can include two flanges 131 which interact with the connection 132 to secure the actuator rod 130. In some embodiments, multiple sets of flanges 131 can be formed around the sleeve 88 that can be used to connect to multiple actuator rods. For example, three sets of flanges 131 can be used to connect three actuators to the sleeve 88.

The connection 132 includes a base plate 134 and a top plate 136 which are clamped together to secure the actuator rod 130 to the sleeve 88. In some embodiments the connection 132 can be a carbon-carbon to metallic clamp arrangement that accommodates a thermal growth mismatch between carbon-carbon and metallic structures. Such an embodiment can be useful if, for example, the sleeve 88 is formed of carbon-carbon and the actuator rod 130 is metallic. The base plate 134 and the top plate 136 have a curvature matched with the curvature of the sleeve 88 and either can be made of a high temperature nickel material such as IN 718 or Mar-M-247 to set forth just a few non-limiting examples. The base plate 134 includes lugs 138 which can be designed to rest between the flanges 131 of the sleeve 88 and are used to position the translating cylindrical shell circumferentially with respect to the mounted actuators. The lugs 138 can, but need not, contact the flanges 131. The lugs 138 can have openings 140 formed therein which may be used to receive a bolt or other device that connects the base plate 134 to the top plate 136. The base plate 134 can also include a finger 142 formed as a cylinder in the illustrative embodiment, but can take on different shapes in other embodiments.

In one form, the top plate 136 includes openings 144 and 146. The openings 144 can correspond to the openings 140 on the base plate 134 and can be sized to permit the insertion of a bolt, pin, rivet, or other like device that can be used to clamp the top plate 136 to the base plate 134. The opening 146 can be sized to receive the finger 142. When the top plate 136 and the base plate 134 are clamped and the sleeve 88 is sandwiched in between, loads from the actuator transferred through the actuator rod can be applied through the clamping mechanism and into the sleeve 88.

One embodiment of the present application includes a gas turbine engine having a compressor, a first combustor, a turbine, and a second combustor. Airflow entering an inlet of the gas turbine engine is compressed by the compressor and thereafter flows to the first combustor to be mixed with a fuel and burned to create a stream of air and combustion products. The turbine is positioned downstream of the first combustor and extracts mechanical energy from the stream of air and combustion products flowing from the first combustor. The second combustor is positioned downstream of the turbine and includes a first inlet aperture and a second inlet aperture. The first inlet aperture admits the stream of air and combustion products flowing from the first combustor and exiting the turbine into the second combustor. The temperature of the stream exiting the turbine is hot enough to cause auto-ignition of an air/fuel mixture. The second inlet aperture admits a flow of bypass air coming from the inlet of the gas turbine engine. The bypass air is mixed with a fuel prior to entering the second combustor and is burned upon contact with the hot stream of air and combustion products entering through the first inlet aperture.

One aspect of the present application provides an apparatus comprising a gas turbine engine having a first combustion zone located upstream of a second combustion zone, the second combustion zone having a first inlet and a second inlet, the first inlet operable to accept products of combustion from the first combustion zone and the second inlet operable to accept bypass air.

Another aspect of the present application provides an apparatus comprising a gas turbine engine having a first combustion zone located upstream of a second combustion zone, the second combustion zone having a first inlet and a second inlet, the first inlet operable to accept products of combustion from the first combustion zone and the second inlet operable to accept bypass air, the gas turbine engine having a mode of operation wherein a fuel can be combusted within the second combustion zone without the aid of a mechanical flameholder.

One feature of the present application further includes a valve located in fluid communication with the second inlet and structured to variably admit the bypass air into the second combustion zone via the second inlet.

Another feature of the present application provides wherein the valve is axially movable.

Yet another feature of the present application further includes an aperture formed in the second inlet and an air injection source created by a position of the valve in conjunction with the aperture of the outer wall, wherein the air injection source creates a penetration air jet to achieve optimum combustion reaction and mixing without disturbing an auto-ignition flame stabilization.

Still yet another feature of the present application further includes a turbine disposed between the first combustion zone and the second combustion zone.

Yet still another feature of the present application further includes a variable nozzle cowl positioned downstream of the second combustion zone, wherein the variable nozzle cowl is operable to vary a cross sectional area of an exit flow path in conjunction with the acceptance of bypass air into the second combustion zone.

A further feature of the present application further includes a screech cavity disposed in the gas turbine engine and configured to interact with the second combustion zone.

A yet further feature of the present application further includes an inlet nozzle configured in the gas turbine engine, wherein the inlet nozzle provides the bypass air to the second combustion zone.

Still another aspect of the present application provides an apparatus comprising a gas turbine engine ramburner combustor having an inlet configured to accept bypass air, and a shroud capable of movement to a variable position between and including an inlet open position and an inlet closed position, wherein the position of the shroud determines the amount of bypass air accepted by the gas turbine engine ramburner combustor.

One feature of the present application provides wherein the shroud is a slidable cylindrical shell having an aperture.

Another feature of the present application further includes a forward radial flange, an aft radial flange, an aft piston ring, and a forward piston ring, wherein the forward piston ring and the aft piston ring are located at the radially outer end of the forward radial flange and the aft radial flange, respectively, wherein the piston rings provide a sealing mechanism for the bypass air, and wherein bypass air is restricted from entering the ramburner when the aperture of the cylindrical shell is forward of the forward piston ring.

Yet another feature of the present application provides further includes an actuator configured to move the shroud to the variable position.

Still yet another feature of the present application further includes a thermal growth clamp structured to connect the shroud and the actuator, wherein the shroud and the actuator are made from different materials and where in the thermal growth clamp is configured to accommodate different growth of the different materials under thermal loading conditions.

A further feature of the present application provides wherein the shroud is slidable.

Yet still another aspect of the present application provides an apparatus comprising a gas turbine engine ramburner combustor operable to produce an auto-ignition combustion having an inlet configured to accept bypass air, and a shroud capable of movement to a variable position between and including an inlet open position and an inlet closed position, wherein the position of the shroud determines the amount of bypass air accepted by the gas turbine engine ramburner combustor.

Yet a further aspect of the present application provides an apparatus comprising a gas turbine engine combustion area, a plenum in fluid communication with the combustion area, the plenum having an exit aperture configured to convey bypass air to the combustion chamber and a cover moveable from an open position to a closed position and capable of being moved to a selectable position between and including the open position and the closed position, wherein the amount of bypass air that is conveyed to the combustion area is dependent upon the selectable position of the cover.

A feature of the present application further includes a cover aperture formed in the cover, wherein at least part of the cover aperture overlays an inlet to the plenum when the cover is intermediate the open position and the closed position.

Still a further aspect of the present application provides a method comprising capturing an inlet flow stream of a gas turbine engine, bypassing a portion of the inlet flow stream, combusting a fuel/air mixture within a first combustor positioned intermediate a compressor and a turbine of the gas turbine engine, metering a portion of the bypassed inlet flow stream into a second combustor downstream of a turbine by moving a meter valve and auto igniting a mixture of the bypassed portion of the inlet flow stream, a fuel, and a product of combustion from the first combustor.

A feature of the present application provides wherein the metering includes sliding the meter valve from a first position to a second position.

Another feature of the present application provides wherein the auto-ignition includes providing fuel from a delivery source located downstream of the turbine.

Yet another feature of the present application provides wherein the metering portion of the bypassed air includes providing high penetration and low penetration air jets into the second combustor.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
a gas turbine engine having a first combustion zone located upstream of a second combustion zone, the second combustion zone having a first inlet and a second inlet, the first inlet operable to accept products of combustion from the first combustion zone and the second inlet operable to accept bypass air, the gas turbine engine having a mode of operation wherein a fuel can be combusted within the second combustion zone without the aid of a mechanical flameholder;
wherein the second inlet includes a plenum defined by a forward fixed flange, an aft fixed flange, an aft piston ring, and a forward piston ring, wherein the forward piston ring and the aft piston ring are affixed at the radially outer end of the forward fixed flange and the aft fixed flange, respectively, wherein the piston rings provide a sealing mechanism for the bypass air when in contact with a valve, wherein the valve is structured to variably admit the bypass air into the second combustion zone via the second inlet.

2. The apparatus of claim 1, wherein the valve is axially movable.

3. The apparatus of claim 1, which further includes an aperture formed in the second inlet and an air injection source created by a position of the valve in conjunction with the aperture of the outer wall, wherein the air injection source creates a penetration air jet to achieve optimum combustion reaction and mixing without disturbing an auto-ignition flame stabilization.

4. The apparatus of claim 1, which further includes a turbine disposed between the first combustion zone and the second combustion zone.

5. The apparatus of claim 1, which further includes a variable nozzle cowl positioned downstream of the second combustion zone, wherein the variable nozzle cowl is operable to vary a cross sectional area of an exit flow path in conjunction with the acceptance of bypass air into the second combustion zone.

6. The apparatus of claim 1, which further includes a screech cavity disposed in the gas turbine engine and configured to interact with the second combustion zone.

7. The apparatus of claim 1, which further includes an inlet nozzle configured in the gas turbine engine, wherein the inlet nozzle provides the bypass air to the second combustion zone.

8. An apparatus comprising:
a gas turbine engine ramburner combustor operable to produce an auto-ignition combustion having an inlet configured to accept bypass air; and
a shroud capable of movement to a variable position between and including an inlet open position and an inlet closed position, wherein the position of the shroud determines the amount of bypass air accepted by the gas turbine engine ramburner combustor;
a forward stationary radial flange, an aft stationary radial flange, an aft piston ring, and a forward piston ring, wherein the forward piston ring and the aft piston ring are located at the radially outer end of the forward stationary radial flange and the aft stationary radial flange, respectively, wherein the piston rings provide a sealing mechanism for the bypass air, and wherein bypass air is restricted from entering the ramburner when the aperture of the cylindrical shell is forward of the forward piston ring.

9. The apparatus of claim 8, wherein the shroud is a slidable cylindrical shell having an aperture.

10. The apparatus of claim 8, which further includes an actuator configured to move the shroud to the variable position.

11. The apparatus of claim 10, which further includes a thermal growth clamp structured to connect the shroud and the actuator, wherein the shroud and the actuator are made from different materials and where in the thermal growth clamp is configured to accommodate different growth of the different materials under thermal loading conditions.

12. The apparatus of claim 8, wherein the shroud is slidable.

13. An apparatus comprising:
a gas turbine engine having a combustion area and a bypass passage in communication with the combustion area;
a plenum in fluid communication between the combustion area and the bypass passage, the plenum having opposed upstanding walls each having respective piston rings separated by an axial distance and extending away from an exit aperture of the plenum where the opposed upstanding walls and exit aperture remain in a static configuration relative to one another during operation of the gas turbine engine, the plenum configured to convey bypass air to the combustion area; and
a cover moveable from an open position to a closed position and capable of being moved to a selectable position between and including the open position and the closed position, wherein the amount of bypass air that is conveyed to the combustion area is dependent upon the selectable position of the cover, and wherein the cover is in contact with the respective piston rings when in the closed position to provide a seal.

14. The apparatus of claim 13, which further includes a cover aperture formed in the cover, wherein at least part of the cover aperture overlays an inlet to the plenum when the cover is intermediate the open position and the closed position.

15. A method comprising:
capturing an inlet flow stream of a gas turbine engine;
bypassing a portion of the inlet flow stream;
combusting a fuel/air mixture within a first combustor positioned intermediate a compressor and a turbine of the gas turbine engine;
metering a portion of the bypassed inlet flow stream into a plenum having stationary upstanding walls prior to being introduced via a plenum outlet into a ramburner combustor located downstream of a turbine, the upstanding walls located upstream of the plenum outlet and each having piston rings, the metering accomplished by moving a meter valve in contact with the piston rings; and
auto igniting a mixture of the bypassed portion of the inlet flow stream, a fuel, and a stream that includes a product of combustion from the first combustor.

16. The method of claim 15, wherein the metering includes sliding the meter valve from a first position to a second position.

17. The method of claim 15, wherein the auto-ignition includes providing fuel from a delivery source located downstream of the turbine.

18. The method of claim 15, wherein the metering portion of the bypassed air includes providing high penetration and low penetration air jets into the second combustor.

\* \* \* \* \*